United States Patent
Clubb et al.

(10) Patent No.: US 8,830,831 B1
(45) Date of Patent: *Sep. 9, 2014

(54) ARCHITECTURE FOR BALANCING WORKLOAD

(75) Inventors: Ian James Clubb, Cambrige (GB); Philip Geoffrey Claridge, Cambridge (GB); Thomas Joseph Shusta, Longwood, FL (US); Jeffrey M. Miller, Ovieda, FL (US)

(73) Assignee: Netcracker Technology Solutions Inc., Cincinnati, OH (US)

( * ) Notice: Subject to any disclaimer, the term of this patent is extended or adjusted under 35 U.S.C. 154(b) by 1078 days.

This patent is subject to a terminal disclaimer.

(21) Appl. No.: 12/651,720

(22) Filed: Jan. 4, 2010

Related U.S. Application Data

(63) Continuation of application No. 11/197,597, filed on Aug. 4, 2005, now Pat. No. 7,668,093, and a continuation of application No. 10/682,601, filed on Oct. 9, 2003.

(60) Provisional application No. 60/598,951, filed on Aug. 5, 2004.

(51) Int. Cl.
H04J 1/16 (2006.01)

(52) U.S. Cl.
USPC .......... 370/231; 370/235; 370/389; 370/392; 370/351

(58) Field of Classification Search
USPC .......... 705/14.5; 370/231, 235, 389, 392, 351
See application file for complete search history.

(56) References Cited

U.S. PATENT DOCUMENTS

| | | | | |
|---|---|---|---|---|
| 5,005,122 A | * | 4/1991 | Griffin et al. | 709/203 |
| 5,167,019 A | * | 11/1992 | Fava et al. | 709/240 |
| 5,404,294 A | * | 4/1995 | Karnik | 715/236 |
| 6,199,099 B1 | * | 3/2001 | Gershman et al. | 709/203 |
| 6,490,601 B1 | * | 12/2002 | Markus et al. | 715/207 |
| 6,604,075 B1 | * | 8/2003 | Brown et al. | 704/270.1 |
| 6,651,217 B1 | * | 11/2003 | Kennedy et al. | 715/224 |
| 6,687,873 B1 | * | 2/2004 | Ballantyne et al. | 715/215 |
| 6,785,685 B2 | * | 8/2004 | Soetarman et al. | 1/1 |
| 7,012,888 B2 | | 3/2006 | Schoeneberger et al. | |
| 7,110,979 B2 | * | 9/2006 | Tree | 705/39 |
| 7,174,506 B1 | * | 2/2007 | Dunsmoir et al. | 715/207 |
| 7,337,229 B2 | * | 2/2008 | Dutta et al. | 709/229 |
| 7,584,151 B2 | * | 9/2009 | Wells et al. | 705/64 |
| 8,019,960 B2 | * | 9/2011 | Gladwin et al. | 711/171 |
| 2001/0027441 A1 | * | 10/2001 | Wankmueller | 705/41 |
| 2001/0034725 A1 | * | 10/2001 | Park et al. | 705/79 |
| 2002/0055909 A1 | * | 5/2002 | Fung et al. | 705/42 |
| 2002/0072922 A1 | * | 6/2002 | Suzuki et al. | 705/1 |
| 2002/0107755 A1 | * | 8/2002 | Steed et al. | 705/26 |
| 2003/0097331 A1 | * | 5/2003 | Cohen | 705/39 |
| 2003/0216996 A1 | * | 11/2003 | Cummings et al. | 705/39 |
| 2004/0133622 A1 | * | 7/2004 | Clubb et al. | 709/200 |

OTHER PUBLICATIONS

Office Action issued against U.S. Appl. No. 10/666,631 dated Sep. 27, 2010.
Office Action dated Mar. 31, 2011 for U.S. Appl. No. 10/666,631.
Office Action dated Dec. 23, 2010 for U.S. Appl. No. 11/555,518.

\* cited by examiner

Primary Examiner — Ricky Ngo
Assistant Examiner — Dewanda Samuel
(74) Attorney, Agent, or Firm — Foley & Lardner LLP

(57) ABSTRACT

Embodiments of an invention are disclosed which provide a framework to transition and re-partition information for event processing and downstream processing.

11 Claims, 15 Drawing Sheets

FIG. 13A

| JOB ID | JOB Type (who) | MF ID | File Name | Read To | Written To | Args (which PE) | bytes behind | job status | file status | jhf status |
|---|---|---|---|---|---|---|---|---|---|---|
| 1 | EM | 1 | cs.log.1 | 0 | 0 | 1 | 0 | READY | INPROG | READY |

FIG. 13B

| JOB ID | JOB Type (who) | MF ID | File Name | Read To | Written To | Args (which PE) | bytes behind | job status | file status | jhf status |
|---|---|---|---|---|---|---|---|---|---|---|
| 1 | EM | 1 | cs.log.1 | 0 | 0 | 1 | 0 | CLAIMED | INPROG | INPROG |

FIG. 13C

| JOB ID | JOB Type (who) | MF ID | File Name | Read To | Written To | Args (which PE) | bytes behind | job status | file status | jhf status |
|---|---|---|---|---|---|---|---|---|---|---|
| 1 | EM | 1 | cs.log.1 | 500 | 500 | 1 | 0 | CLAIMED | INPROG | INPROG |
| 3 | ES | 4 | es.log.4 | 0 | 300 | 1 | 300 | READY | INPROG | READY |
| 4 | WS | 5 | ws.log.5 | 0 | 200 | 1 | 200 | READY | INPROG | READY |

FIG. 13D

| JOB ID | JOB Type (who) | MF ID | File Name | Read To | Written To | Args (which PE) | bytes behind | job status | file status | jhf status |
|---|---|---|---|---|---|---|---|---|---|---|
| 1 | EM | 1 | cs.log.1 | 500 | 500 | 1 | 0 | DONE | DONE | DONE |
| 3 | ES | 4 | es.log.4 | 100 | 300 | 1 | 200 | CLAIMED | DONE | INPROG |
| 4 | WS | 5 | ws.log.5 | 100 | 200 | 1 | 100 | CLAIMED | DONE | INPROG |

FIG. 13E

| JOB ID | JOB Type (who) | MF ID | File Name | Read To | Written To | Args (which PE) | bytes behind | job status | file status | jhf status |
|---|---|---|---|---|---|---|---|---|---|---|
| 1 | EM | 1 | cs.log.1 | 500 | 500 | 1 | 0 | DONE | DONE | DONE |
| 3 | ES | 4 | es.log.4 | 200 | 300 | 1 | 100 | CLAIMED | DONE | READY |
| 4 | WS | 5 | ws.log.5 | 200 | 200 | 1 | 0 | DONE | DONE | DONE |

FIG. 13F

| JOB ID | JOB Type (who) | MF ID | File Name | Read To | Written To | Args (which PE) | bytes behind | job status | file status | jhf status |
|---|---|---|---|---|---|---|---|---|---|---|
| 1 | EM | 1 | cs.log.1 | 500 | 500 | 1 | 0 | DONE | DONE | DONE |
| 3 | ES | 4 | es.log.4 | 300 | 300 | 1 | 0 | DONE | DONE | DONE |
| 4 | WS | 5 | ws.log.5 | 200 | 200 | 1 | 0 | DONE | DONE | DONE |

ARCHITECTURE FOR BALANCING WORKLOAD

CROSS-REFERENCE TO RELATED APPLICATIONS

This non-provisional patent application claims priority from and is based on U.S. Provisional Application No. 60/598,951 to Clubb et al., filed Aug. 5, 2004, and U.S. Nonprovisional patent application Ser. No. 11/197,597 to Clubb et al., filed Aug. 4, 2005, both of which are hereby incorporated by reference in their entirety. This application also claims priority from U.S. Nonprovisional patent application Ser. No. 10/682,601 to Clubb et al., filed on Oct. 9, 2003, which is hereby incorporated by reference in its entirety.

BACKGROUND OF THE INVENTION

1. Field of the Invention

The field of invention relates generally to a computerized architecture for facilitating work management.

2. Description of the Related Art

Authorization ensures that the paying party has sufficient credit to cover the cost of the event. Before and during the event, settlement is not important. Since the authorization must be completed before the transaction can proceed, latency is critical, as is the availability of the system. Authorization may involve a reservation element. An example of an authorization without reservation would be 'has the customer bought unlimited access to music downloads for this month', and authorization/reservation examples include credit card style authorization and requests such as 'confirm and reserve that the customer has the funds for a 100 MByte content download'.

A system for meeting the requirements of relationship-centric authorization is detailed in U.S. patent application Ser. No. 10/682,601 (System and Method for Work Management, Clubb et al., filed Oct. 9, 2003) and U.S. patent application Ser. No. 10/682,663 (System and Method for Revenue and Authorization Management, Clubb et al., filed Oct. 9, 2003) which are hereby incorporated by reference. U.S. patent application Ser. No. 11/151,930 (System and Method for a Functional Extensibility Framework, Clubb et al., filed Jun. 14, 2005) is also incorporated by reference.

Features of the various embodiments of these systems may promote functionality, availability, and throughput for authorization processing by logically partitioning key servers and/or independently partitioning a balance associated with a group of consumers across the set of logical servers associated therewith, and/or independently logically partitioning the data storage (data storage may include but is not limited to merely relational databases). It should also be noted that the functionality of the system may be easily applied to more than just authorization processing but should also include pure transactions, usage based transactions, reservations, permission checking . . . virtually any application with a high volume of throughput and may be applied to a number of industries including, but not limited to telecommunications, transport, retail and banking.

The current invention may preferably integrate with the systems described in the aforementioned patent applications, may be integrated into other systems, or may stand on its own.

A computerized system comprises one or more computers/processors in communication with one another that are programmed to ensure that the paying party has sufficient credit to cover the cost of the event and to provide reconciliation or other downstream processing of data produced by processing the event. This may be particularly relevant to telecommunications events but may be used in an ASP model or for use of functionality at kiosks. Some non-limiting definitions of terms used in this document follow.

A computer/processor is a device that accepts information (in the form of digitalized data) and manipulates it for some result based on a program or sequence of instructions on how the data is to be processed. Complex computers also include the means for storing data (including the program, which is also a form of data) for some necessary duration. A program may be invariable and built into the computer (and called logic circuitry as it is on microprocessors) or different programs may be provided to the computer (loaded into its storage and then started by an administrator or user).

A computer readable medium includes the gamut from disks, CDs, memory, or any storage that a computer may be capable of assimilating. Computer executable instructions include programs, routines, modules, and scripts.

An architecture comprises, in information technology, especially computers and more recently networks, both the process and the outcome of thinking out and specifying the overall structure, logical components, and the logical interrelationships of a computer, its operating system, a network, or other conception. Computer architecture can be divided into five fundamental components: input/output, storage, communication, control, and processing. In practice, each of these components (sometimes called subsystems) is sometimes said to have an architecture, so, as usual, context contributes to usage and meaning.

A router may be a device or, in some cases, software in a computer, that determines the next point (i.e., on a network) to which a unit of data (i.e., a packet) should be forwarded toward its destination. A router may be often included as part of a network switch, however a router may also have application specific functionality if it may be unable to determine the destination of the request from the network address alone (unlike a conventional IP router appliance). A router generally functions on the paradigm of single input and single output.

A multiplexer as used in this application refers to a computerized system capable of receiving single/multiple inputs and producing multiple outputs for further distribution to one or more other systems.

An application program interface (API) is the specific method prescribed by a computer operating system or by an application program by which a programmer writing an application program can make requests of the operating system or another application.

A consumer identifier comprises any type of identification (name, customer number, social security number, telephone number, credit card number, employer identification number, group ID, etc.) that may be encoded in a record or request for further processing (including routing where such router depends on the identity of the owner of the request). A consumer identifier may also include namespace. In general, a namespace uniquely identifies a set of names so that there is no ambiguity when objects having different origins but the same names are mixed together. As an example, in the Extensible Markup Language (XML), an XML namespace is a collection of element type and attribute names. These element types and attribute names are uniquely identified by the name of the unique XML namespace of which they are a part. In an XML document, any element type or attribute name can thus have a two-part name consisting of the name of its namespace and then its local (functional) name. In XML, a namespace is commonly given the name of a Uniform Resource Identifier (URI)—such as a Web site's address—both because the namespace may be associated with the site or page of that URI (for example, a company name) and because a URI is conveniently likely to be a unique name. Note that the URI is not necessarily intended to be used other than as a name nor is there any namespace document or XML schema that must be accessed; the URI is simply used as a name (and part of the two-part name of any element type or attribute name so that the names are unique within the document).

A request/event may include authorization requests wherein a consumer may be requesting permission to use or perform a certain task (i.e., make a phone call, play a video game, access a file, utilize a machine such as a dorm washing machine with this functionality built into its interface, etc.). Often authorization will revolve around the credit-worthiness of the consumer, the amount of money available in a particular account, or a specific level of permission granted to that consumer. Requests may also include processing transactions and other customer service functions.

An authorization request may also involve a reservation element. A request may also comprise an event (which may be referred to as a termination event, accounting event, or charge capture in different industries) that may be a historical record of a transaction that may have incurred a charge and has to be recorded. Examples of such events would be phone calls, toll usage, downloads. Events do not have to be chargeable and may be recorded for informational purposes (e.g. 1-800 calls, 911 calls).

Programming means include any computer techniques/tools/languages/methodologies that are available to those of skill in the art.

A tag is a generic term for a computerized language element descriptor which may comprise a sequence of characters or other symbols which describe the document's logical structure (e.g., XML, SGML, HTML).

A plurality may be taken to mean two or more in a preferred embodiment, however, embodiments which describe a plurality may also be understood to function with only one of said component.

A server may be a computer program or even a thread that provides services to other computer programs in the same or other computers. The computer that a server program runs in may be also frequently referred to as a server (though it may contain a number of server and client programs).

A logical partition, as used in this application, may be the division of any of a computer system's work, processes, and storage into multiple sets of resources so that each set of resources can be operated independently. Requests for a number of logical partitions may be processed by an application (with one or more child threads or processes, with a number of associated application caches) that may be responsible for undertaking the processing on behalf of a number of logical partitions where the logical partitioning per application can be changed at runtime. While it is anticipated that each logical partition may have a dedicated process, by allowing multiple logical processing partitions to be dynamically assigned to a process allows consolidation of the number of network, cache, and I/O resources needed to allow the system to be divided into a large number of logical partitions to give fine grained control of the system processing. Each partition can communicate with the other partitions as if the other partition may be in a separate machine.

BRIEF SUMMARY OF THE INVENTION

There is disclosed a framework to transition and re-partition information in a real time system comprising the following computerized components and processes (components and processes may each be considered in the singular and/or the plural): Consumer Server (CS), File Control Database (FCD), Event Manager (EM), Event Store (ES), and Configurable Output Stream (COS). The EM process may be enhanced though the use of more tags inserted by the CS to insert information into other downstream systems.

Embodiments may include a near-real-time mechanism to repartition and distribute information generated by a partitioned real time transaction processing system.

The Consumer Servers (CS) (120) may each generate a log file with all events and charges. The Consumer Servers may continue to work even as log files are generated.

The Event Manager (EM) may read CS log files and then the EM may repartition that information, using embedded tags and headers written by the CS, to different destinations such as the Event Store (ES) (194) and the Configurable Output Stream (COS) (196). The Event Store (ES) (194) may comprise a historical store of all of the events and their associated charges. The functionality of the Event Manager (135), Event Store (194), and Configurable Output Stream (196) may either synchronously or asynchronously follow the generation of the log file from the CS (120).

Information may be encoded in a Configurable Output Stream (COS) (196). The COS (196) may be passed to downstream systems. The CS (120) generates and classifies information required by each downstream system (including, but not limited to, commission, fraud and data warehouse).

Multiple copies of each component may exist running on separate or common machines. In a preferred embodiment, the overall system architecture (100) is designed to allow processing load to be distributed across multiple logical machines. The system may also function, however, without logically partitioning its various components.

Various Embodiments

In an embodiment there is a computerized architecture for processing events comprising a first router (for example, as depicted FIG. 16 at 115); a set of processors comprising two or more processors (for example, the Consumer Servers (120)); and at least one router/multiplexer (for example, the Event Manager (135)). Two or more logical/virtual processors may exist on a single physical computer. The first router is configured with a set of computer-executable instructions to determine which of said processors should process an event based upon a consumer identifier. For example, in an embodiment built on an authorization system, the CPUB (105) may determine which processor is assigned to an electronic/logical wallet which contains a balance for the person causing the event. The first router is configured to send an event to that processor. The processor may initially process the event. For instance, the processor may perform a balance check on the electronic/logical wallet to determine if it is configured to authorize the event based on the balance available to that consumer. The processor is further configured to send a set of event data relating to said event to said router/multiplexer. For instance, a Consumer Server (120) may generate a log file which it sends to the Event Manager (135) either synchronously or asynchronously. The router/multiplexer may parse the event data and reorganize the event data for further processing. The processor may be further configured to embed a set of tags in said set of event data and said router/multiplexer may be further configured to utilize said set of tags to determine where to send said event data for further processing. The processors may also be configured to create a file comprising the event data which further comprises a header. The processors may store/embed the tags in the header independent of the content portion of the file (event data) so that the router/multiplexer may operate only or alternatively or additionally upon the header to determine where the content should be sent rather than acting upon the content itself.

Duplication of event data may be reduced by mapping/assigning one or more of the processors to a specific router/multiplexer. In a preferred embodiment, this comprises a one-to-one or a many-to-one relationship.

In another embodiment, the processor may be configured to initially process and persist (store) said event and asynchronously send a set of event data relating to said event to said router/multiplexer.

In another embodiment, a computerized architecture for processing events may be further configured to reorganize said event data according to an account identifier for further processing. Thus, log files produced by a Consumer Server that are keyed to a specific customer for purposes of authorization may be grouped together with other log files belonging to the same account for purposes of reconciliation. The results of such reconciliation may be stored at the Event Store (194) and the Wallet Server (190). The processor may be further configured to embed a set of tags in said set of event data and said router/multiplexer may be further configured to utilize said set of tags to determine where to send said event data for further processing.

In another embodiment, said router/multiplexer may be configured to parse said event data to create a file comprising a subset of said event data for additional processing. For example, the Event Manager (135) may take the log file generated by the Consumer Server (120) which includes certain output streams designated for further downstream processing and break these streams out of the log file and send them to the appropriate processes. The processor (e.g., Consumer Server (120)) may be further configured to embed a set of tags in said set of event data and said router/multiplexer is further configured to utilize said set of tags to determine where to send said event data for further processing.

In another embodiment, there may be a computerized architecture for processing events comprising a first router, a set of processors comprising two or more processors, and at least one router/multiplexer. The first router may be configured with a set of computer-executable instructions to determine which of said processors comprises a logical wallet associated with a consumer initiating an event for processing. Here the term logical may refer to the logical partitioning as defined supra or it may simply refer to the computerized nature of the wallet, that is, an electronic as opposed to a physical wallet. The first router may be configured to send said event to said processor determined in the previous step. The processor may check a balance stored on said logical wallet and determines whether said event may be processed according to a set of predetermined rules. The processor may be further configured to send a set of event data relating to said event to said router/multiplexer. The router/multiplexer may then parse said event data and may be configured to reorganize said event data for further processing. The processor may be further configured to embed a set of tags in said set of event data and said router/multiplexer may be further configured to utilize said set of tags to determine where to send said event data for further processing.

In another embodiment, the router/multiplexer may parse said event data and may be configured to reorganize said event data according to an account identifier for reconciliation. This means that the intended downstream process for the log file generated by the processor in the initial processing may be account reconciliation once the event is complete. This processing may occur in real time, in near real time, or at a predetermined time following the event.

In another embodiment, there may be a computerized architecture for processing events comprising a first router; a set of processors comprising two or more processors; and at least one router/multiplexer. The first router may be configured with a set of computer-executable instructions to determine which of said processors comprises a logical wallet associated with a consumer initiating an event for processing. The first router may be configured to send said event to said processor determined in the previous step. The processor may check a balance stored on said logical wallet and determines whether said event may be processed. The processor may be further configured to send a set of event data relating to said event to said router/multiplexer. The router/multiplexer may parse said event data to create a file comprising a subset of said event data for additional processing. Certain event data may be utilized by other downstream systems besides reconciliation systems. The data required by these systems may be specified and submitted to the processor via an application programming interface. Then, when the processor initially processes the event, it may create a separate output stream, to be included in its log file for that event, which contains the data required by the downstream system. The processor may even be able to use lazy evaluation or be further programmed to generate additional/ancillary data to the actual event data to include in the output stream for the downstream process. Please see U.S. patent application Ser. No. 11/151,930 (System and Method for a Functional Extensibility Framework).

In another embodiment, the processor may be further configured to embed a set of tags in said set of event data and said router/multiplexer may be further configured to utilize said set of tags to determine where to send said event data for further processing. The downstream system may comprise a settlement system or a trend analysis system. Trend analysis may be used to track the type of events and usage by a particular consumer or group of consumers. Virtually any type of downstream system that could make use of event data (or additional data derived from event data) may be hooked into the architecture.

In another embodiment, the router/multiplexer may separate out one or more output streams for further distribution.

In another embodiment, an application programming interface may be utilized to specify the output required for a downstream process. The application programming interface may also be utilized to filter out certain records from the output required for the downstream process.

In another embodiment, there may be a method for processing events including the steps of receiving an event on a first router; identifying a consumer associated with said event; determining a processor from a set of two or more processors that is associated with said consumer identified in said previous step; sending said event to said processor; initially processing said event on said processor; generating a set of event data related to said initial processing of said event; sending said set of event data to said router/multiplexer; parsing said event data on said router/multiplexer; and reorganizing said event data for further processing on said router/multiplexer.

In another embodiment, there may be a computerized method for processing events comprising the steps of receiving an event on a first router; identifying a consumer associated with said event; determining a processor from a set of two or more processors that is associated with said consumer identified in said previous step; sending said event to said processor; checking a balance stored on a logical wallet on said processor to determine if said event may be approved;

generating a set of event data related to said event; sending said set of event data to said router/multiplexer; parsing said event data on said router/multiplexer; and reorganizing said event data for further processing on said router/multiplexer based on an account identifier associated with said consumer.

In another embodiment, there may be a computerized method for processing events comprising the steps of receiving an event on a first router; identifying a consumer associated with said event; determining a processor from a set of two or more processors that is associated with said consumer identified in said previous step; sending said event to said processor; checking a balance stored on a logical wallet on said processor to determine if said event may be approved; generating a set of event data related to said event on said processor; defining, through an application programming interface, a subset of said event data; creating at least one subset of said event data with a set of embedded tags indicating an external process; sending said subset to said router/multiplexer; parsing said subset on said router/multiplexer to determine said external process; and sending said subset to said external process.

BRIEF DESCRIPTION OF THE DRAWINGS

FIGS. 13A-13F illustrate an embodiment of file tracking as jobs pass through the Event Manager.

DETAILED DESCRIPTION OF THE INVENTION

Figure 1:
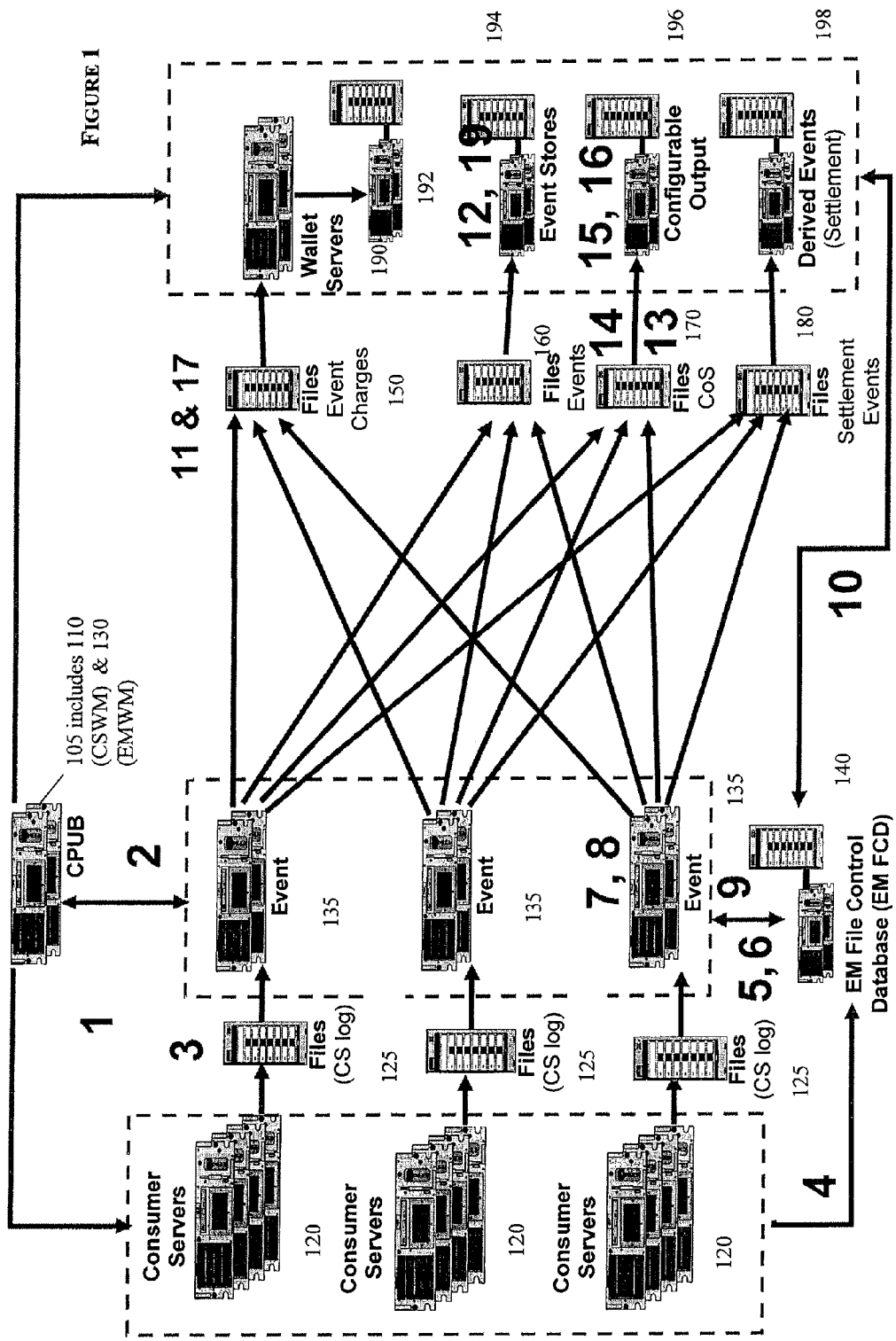
FIG. 1 represents one architecture embodiment of the invention.

Referring to FIG. 1, an embodiment of an architecture (100) is illustrated. Components may work in both a near-real time system and in a real-time system.
Event Manager (135)

Figure 16:
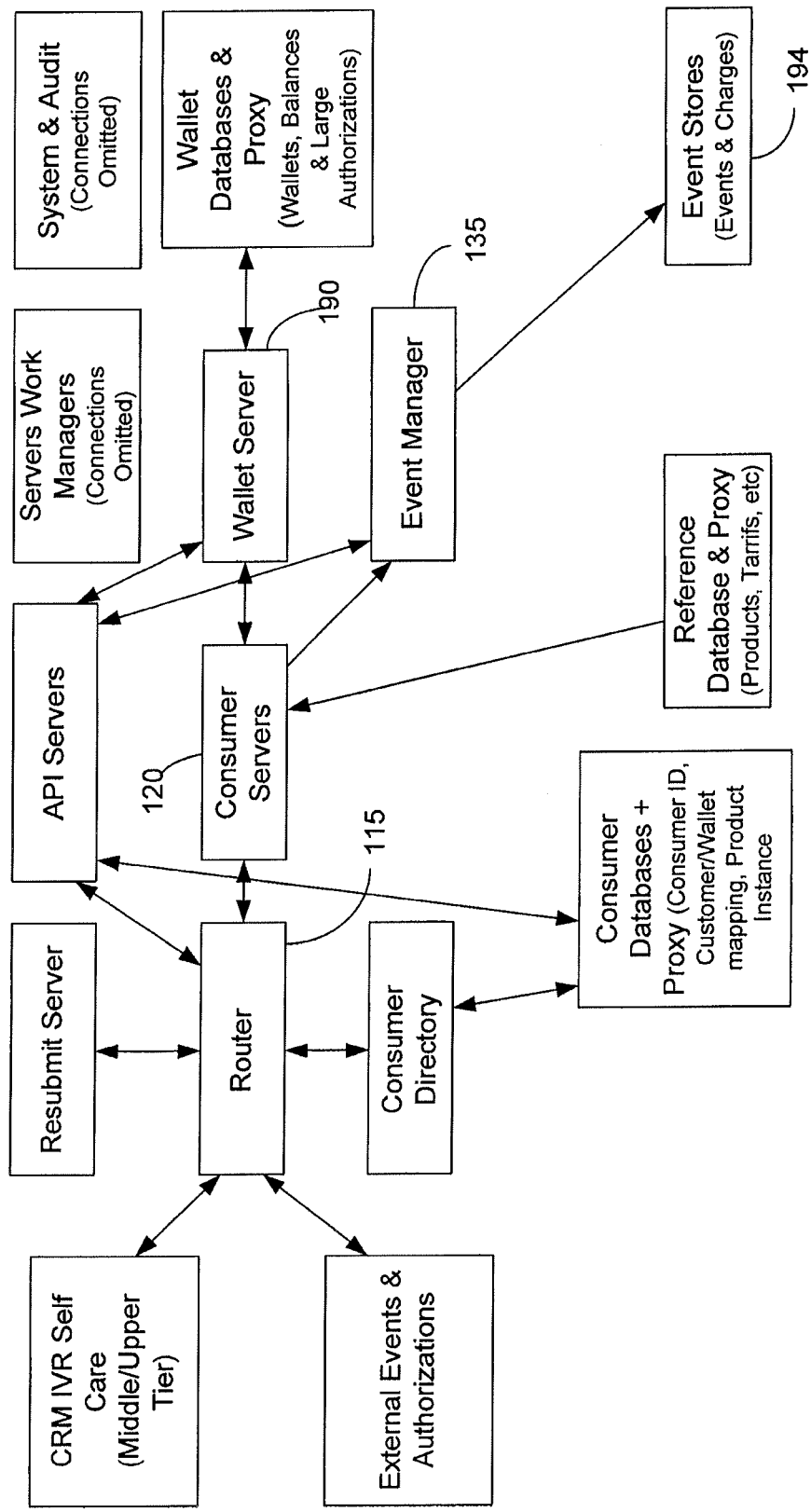
FIG. 16 illustrates a high-level architectural embodiment of the invention.

Referring to FIG. 1(1) (an alternative view of the architecture is depicted in FIG. 16), within the framework, supervisory processes (Command Publisher a.k.a. CPUB (105)) control the workload and partitioning within the system. The Command Publisher (CPUB (105)) works with the Consumer Server Work Manager (CSWM) (110) to Control the Consumer Server (120) workload. The CPUB (105) may relay physical EM (135) assignment information to each CS (120).

Consumer Server (120) processes (and associated child processes) may undertake a partition of work each writing a single log file. FIG. 1 illustrates one CS (120) per machine, however multiple logical CS (120) can be run on a single physical machine. The system may be configured so that each logical CS (120) may generate its own log file. The system may also be configured so that a given machine running one or more CS processes/logical partitions will produce one log file representing all of the partitions. The CPUB (105) may assign new Consumer Servers (120) to EM (135) so that each EM (135) processes a similar partition of the traffic. This can simply be undertaken by allocating the same number of CS (120) per EM (135). In a more sophisticated environment, the processing resource of the EM (135) may be combined with CS (120) throughput information for 'intelligent' work allocation.

Referring to FIG. 1 (3), each Consumer Server (120) may write a log file with information regarding a real-time event including, but not limited to, a charge and Configurable Output Stream (COS) (196). The CS (120) reads the location to which these log files should be written when the CS (120) is started, but these files can continue to be written when the infrastructure to control the file system is unavailable. It gets the location to write the log file by using an internal function that accesses reference data. The Consumer Server writes the initial log file information into the database. In doing so, it assigns the log file to a particular EM.

The CPUB (105) relays CS (120) and wallet server logical to physical mapping information. This includes logical to physical mapping changes.

In a combined real time and near-real time system, information regarding architectural elements may be shared between the systems to ensure that both systems have current information and process events correctly when, for example, new Consumer Servers (120) are brought online (i.e., a new set of log files can be found) or when Consumer Servers fail (i.e., to flush remaining data from the log files through the near real-time processes). The path to write the log files for a given CS (120) may be controlled by tables in the FCD (140).

Referring to FIG. 1 (2), the Event Manager Work Manager (EMWM) (130) may receive information from the Consumer Server Work Manager process (CSWM) (110) listing the operational Consumer Servers (120) and the EMWM (130) may assign the output log file of each CS (120) to be processed by a particular Event Manager (EM) (135). While each CS (120) may process a number of logical partitions, the mapping from CS (120) to a particular EM (135) may be based on physical Consumer Server (120) processes to ensure that only one EM processes each CS log file (125).

The EMWM (130) and CPUB (105) assigns each file to a physical EM (135). The EM (135) determines the first log file to work on by using their ID in a search of the File Control Database. Once this initial file is determined, all subsequent CS log file (125) can be found and added to the database by following the linked list of files. The CS (120) may operate even if the FCD (140) is offline.

The EM (135) operation may be driven by the routing headers embedded within the CS log file (125) records. The EM (135) may separate and pass the non-COS (196) information to the appropriate downstream systems. The COS (196) data may then be separated into output files/streams as defined in the file tags. The EM (135) may cache open file handles so that output files are not opened and closed for each COS (196) record within an event. The EM (135) may update the FCD (140) to allow downstream systems to read the COS (196) information as accumulated in the output files. COS (196) tags may identify the data as COS (196) as well as its intended destination.

Referring to FIG. 1 (4), bulk information may be passed between processes via simple files (e.g., on network attached storage). These files may be managed and released for processing between the processing elements via the File Control Database (FCD) (140). The FCD (140) may manage files as 'jobs' to ensure that each source file is processed by all of the destination processes. The FCD (140) may provide a simple file based persistent subscribe/publish system to accomplish this.

The FCD (140) may also support the transfer of watermarks to allow reader processes to access files while they are still being written. File locking may also be utilized.

Referring to FIG. 1 (5), files may be created by the CS (120) (marked with the Consumer Server transient pool element ID). Log files written by a CS (120) process may be registered with the FCD (140). The names of subsequent files for a particular CS (120) may be generated algorithmically so that each log file may contain the name of the next log file for consistency checking. This allows the CS (120) to continue processing even if the FCD (140) is down. As the CS log file (125) is written, the committed file size may be held within the CS log file (125). Next, the CS (120) may write a transaction size before each transaction and the EM (135) may read until the transaction size read matches what the CS (120) states was written. The CS (120) also may have a backup log file location (not shown), so that the application can write files to an alternate location (e.g., NAS storage, 'hot' standby). The distributor process may also generate files registered in the FCD (140) for processing by the EM (135). These files may contain work that contained errors and could not be routed to any Consumer Server (120). In an alternative scenario, these files may contain work or that timed out within the Consumer Server (120). As each CS log file (125) is written, the file may be marked with an end-of-transaction record. Both the Distributor log files and CS log files (125) may also contain data to provide a check against files getting lost.

Referring to FIG. 1 (6), as each file is completed by the CS (120). The EM (135) may then close each CS log file (125) when it reaches an end-of-file mark (or some other indication that the file is complete). Each log file may have an embedded link to the name of the next file.

Referring to FIG. 1 (7), each EM (135) reads the log files from a subset of Consumer Servers (120), and writes out separate files for the destinations including ES (194), WS (190) and COS (196). The EM (135) can read each CS log file (125) while still being written by the CS (120) up to the last written transaction. The EM (135) may know nothing of the application content of the data that it reads. The CS (120) may write a multiple part (multi-set) record to the log file for each record processed by the CS (120). This multi-part record may contain a number of headers that allows the EM (135) to simply split out information to the different destinations. The system may be reconfigured at run time for the CS (120) to generate another output set within the CS (120) that is then accumulated as files in the FCD (140) for the new set of downstream process.

Referring to FIG. 1 (8), recoverability of the EM (135) may follow a heartbeat pump cycle (e.g., 1 beat per second, 10 beats per second). The heartbeat means that the EM (135) cyclically reads and writes files and then, in a single transaction to the FCD (140), updates the read/write pointers.

The EM (135) may ensure that all of the output files exist, are open and are registered within the FCD (140).

Referring to FIG. 1 (9), the EM (135) may read multiple log files (always reading one or more complete CS (120) transactions of data as marked in the input file from all the associated CS log filed (125). EM may then buffer and split the input records in memory and write the output files. The EM (135) may maintain file offset counters in memory for all input and output files. The EM (135) may then commit the output files as well as the CS input file "written to" offsets so that the EM is aware of how much data, in the CS log file (125), it has committed.

The input and output file offsets held in the FCD (140) may be updated for each database transaction. Specifically, the EM (135) may update read pointers for all of the CS log file (125) and write offsets of all of the output files. In the event of an EM (135) failure, these offsets may be used to allow the replacement EM (135) to position itself exactly to the point of the failed EM (135). The update of the output file offsets also provides a watermark as how far downstream processes can read the file that is being written (see below). In the same transaction the EM (135) may also write history information as to which input file segments were written to which output files.

Referring to FIG. 1 (9), when input files have been completely processed by the EM (135), the associated 'jobs' may be marked as complete. The FCD (140) may support one or more parallel set of consuming processes reading the CS log file (125). These could include processes to archive all of the usage onto a separate site, or code to allow the records to be fed into a legacy billing system or other systems.

Referring to FIG. 1 (10-11), communication between the components may be performed via the FCD (140) in the form of jobs that contain files. Jobs may be created by the EM (135) for each of the downstream consumer classes (e.g., ES (194), WS (190), COS (196)), and these jobs can in turn be marked to allow the files to be read by multiple consumers. Storage could be partitioned (e.g., per EM (135), per destination). FCD (140) may hold server location and path for each traffic type per logical server partition.

Referring to FIG. 1 (12), the Event Manager (135) may use tag information per event to steer COS (196) information to the correct file.

Referring to FIG. 1 (13), the COS (196) file format may be selected, per stream generated by the EM. File formats may include comma-delimited, binary, hierarchical, XML, XML-derived and more. Other formats will be supported in the future, and the EM may be enhanced to support direct interfaces to public and proprietary messaging systems for COS (196) data in addition to file based output transports.

Referring to FIG. 1 (16), multiple internal and external systems may be registered to read files while still being written by an EM up to the last size committed to an FCD. The same set of files may be read in near real-time and batch (e.g. daily). Files may be retained until all systems have read and acknowledged the files.

Referring to FIG. 1 (17), EM (135) may write out multiple files per Wallet Server, each file with charges from a subset of the CS (120) served by that EM (135). This charge data may then be independently committed to the wallet database.

Referring to FIG. 1 (12, 19), transactional downstream servers (EM (135), ES (194), and WS (190)) may maintain a local transactional watermark to verify data has flushed into stores prior to billing.

Figure 6:
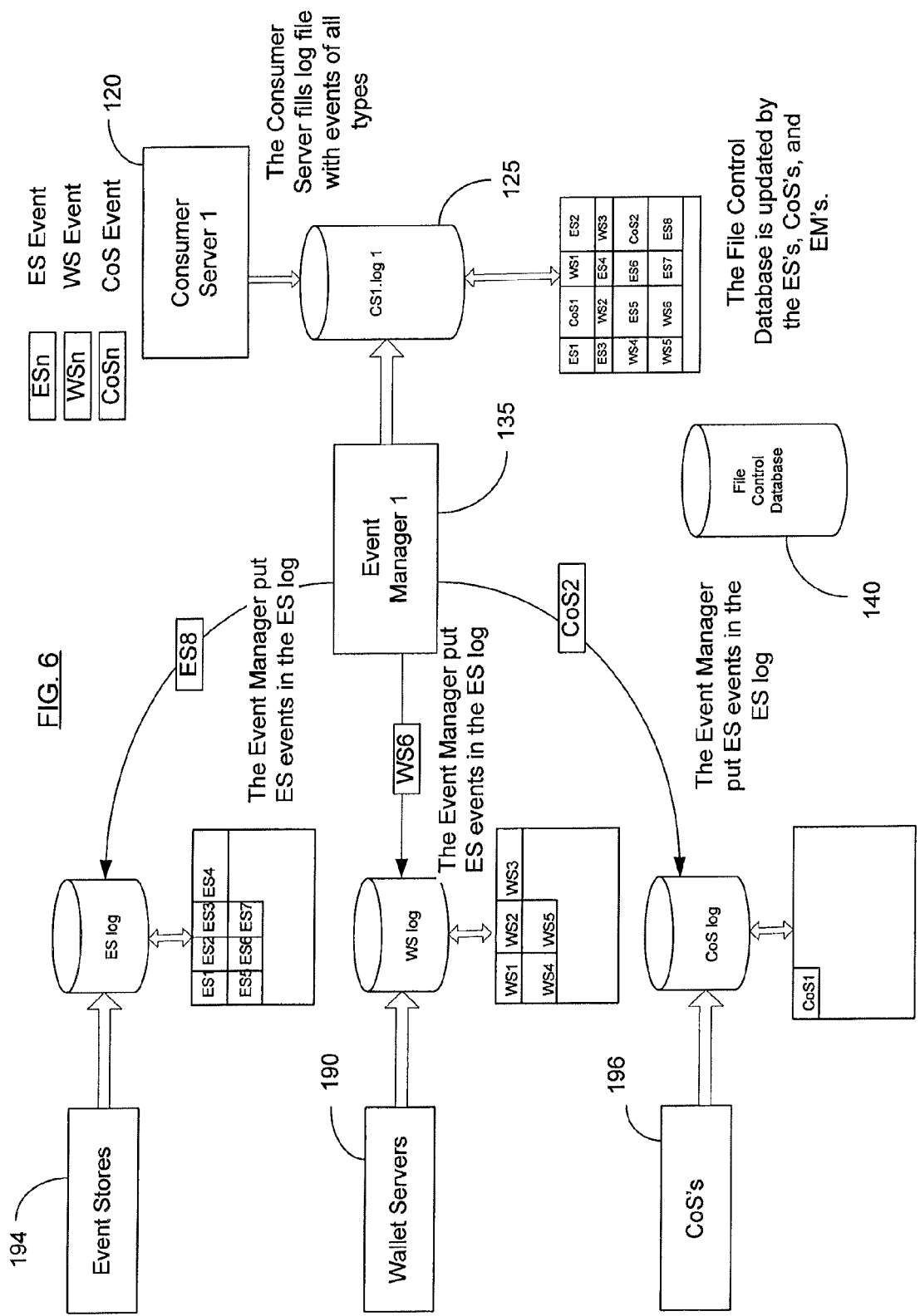
FIG. 6 and FIGS. 7-12 depict an embodiment of the organization of CS generated event (log) files and their partitioning to their appropriate servers including event stores, wallet servers and/or configurable output streams.

Referring to FIG. 6, EM (135) may organize CS (120) generated event (log) files and partition them to their appropriate servers including event stores, wallet servers and/or configurable output streams. The EM (135) may also track of relevant data points in the FCD (140) to handle its own failures. The WS (190) and ES (194) may also track failures.

A common library may reference file locations for writes. A FCD (140) may contain file locations for reads. EM (135) may provide the byte size, to read up to, to the ES (194), WS (190), and COS (196), through the File Management database. The byte size written by the EM may ensure the file is actually written to the point stated within the transaction through "smart coding" the log file sizing information. EM (135) may provide to ES (194), WS (190), and COS (196) end of file information in a File Management database status. CS (120) provides end of file information to EM (135) within CS log file (125).

Referring to FIG. 1(14), in a preferred embodiment, API support, failover support and/or repartition support may be provided. CPUB (105) may boot the correct number of EM servers and threads per each server based on database entries.

APIs allow external systems to receive and acknowledge COS (196) file streams. Referring to FIG. 1(15), multiple external systems may be registered to read any stream of files. The same set of files may be read in near-real time and batch by different external systems. Files may be saved until all registered systems have read and acknowledged the files. It may also handle CS (120) to EM (135) assignment details based on database entries and in case of failover or repartitioning changes.

In various embodiments, the system will be based around the managed reliable delivery of information in files.

The CS (120) may embed Start of Transactions, End of File, and Header messages inside Log files before passing to the EM (135). The CS (120) may link log files together by embedding the next CS log filename within the end-of-file message. The CS (120) may be responsible for determining the location to write log files to. It may get this information by calling an internal CS (120) function, which may access a reference data cache and return the appropriate file directory and name.

EM (135) may check the FCD (140) for any new CS log file (125) that have been written by its assigned range of CS (120). Each EM (135) may retrieve their initial log file name and locations by grabbing the appropriate information from the FCD (140) based on their physical CS (120) assignment.

Event Manager (EM—135) Infrastructure

Figure 7:
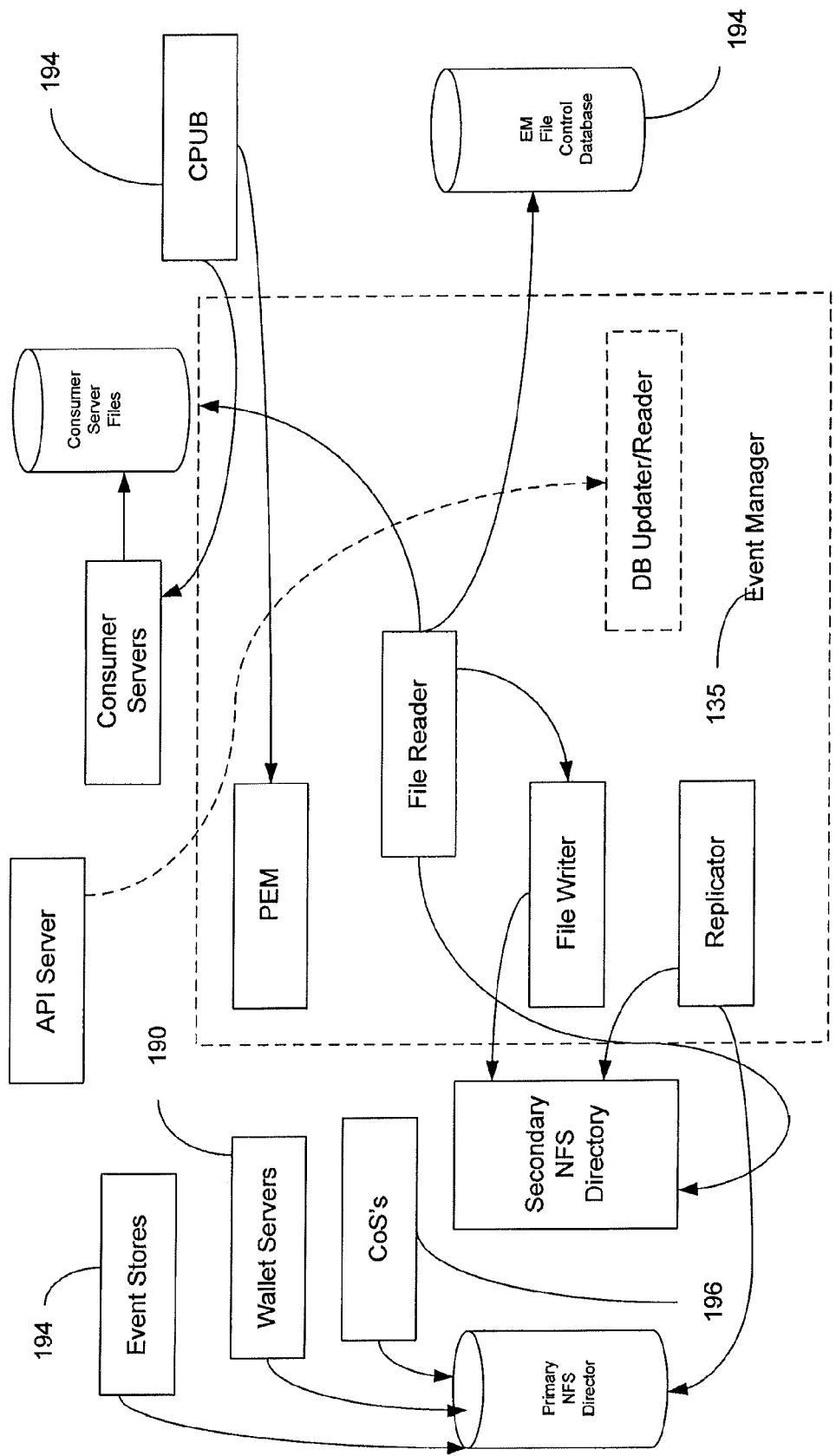

Referring to FIG. 7, the Event Manager infrastructure may comprise multiple threads/processes to handle all of the functionality needed to perform its duties.

File Reader Thread—This thread may retrieve CS (120) output files to process from the FCD (140) (based on assignments from CPUB (105)), reading the CS (120) output files and splitting the workload between the File Writer threads.

File Writer Thread—This thread may write the output files for a particular server. A different thread may exist for every output server.

DB Updater/Reader Thread—This thread may update/read the FCD (140) with API server requests.

Replicator Thread—This thread may duplicate all files to a backup server.

File Management processes/scripts—These may clean-up old, orphaned, and deleted files. These processes/scripts will also handle any archiving duties.

Referring to FIGS. 9-13, any of the EM's threads can have multiple instances running. Generally, however, only the File Reader and Writers will need more than one thread.

In an embodiment, there may be a File Reader thread for each Consumer Server (120) associated with the Event Manager (135). There may also be a File Writer thread for each output server associated with the File Reader thread.

Figure 11:
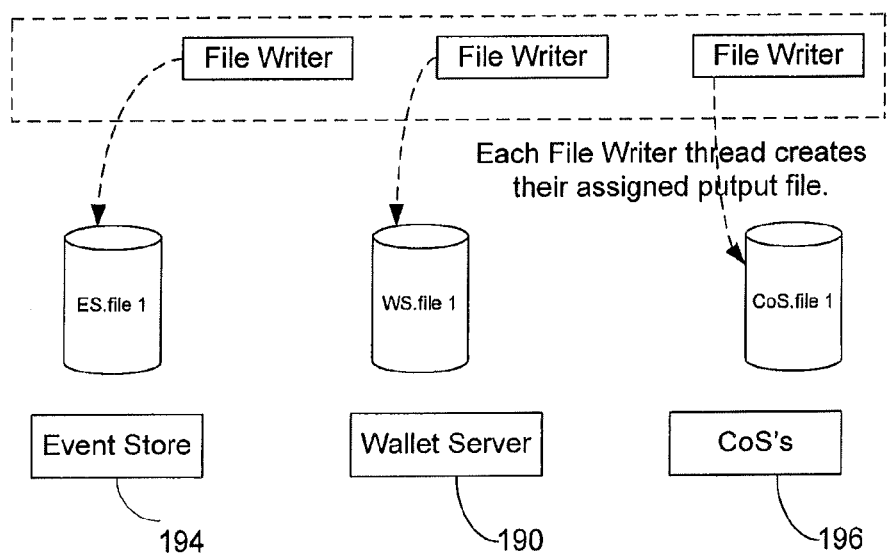

Referring to FIG. 11, the File Reader may periodically send updates on how much their output files have been written to. This may be used to cross-check against the numbers read from the CS (120) output files.

Figure 12:
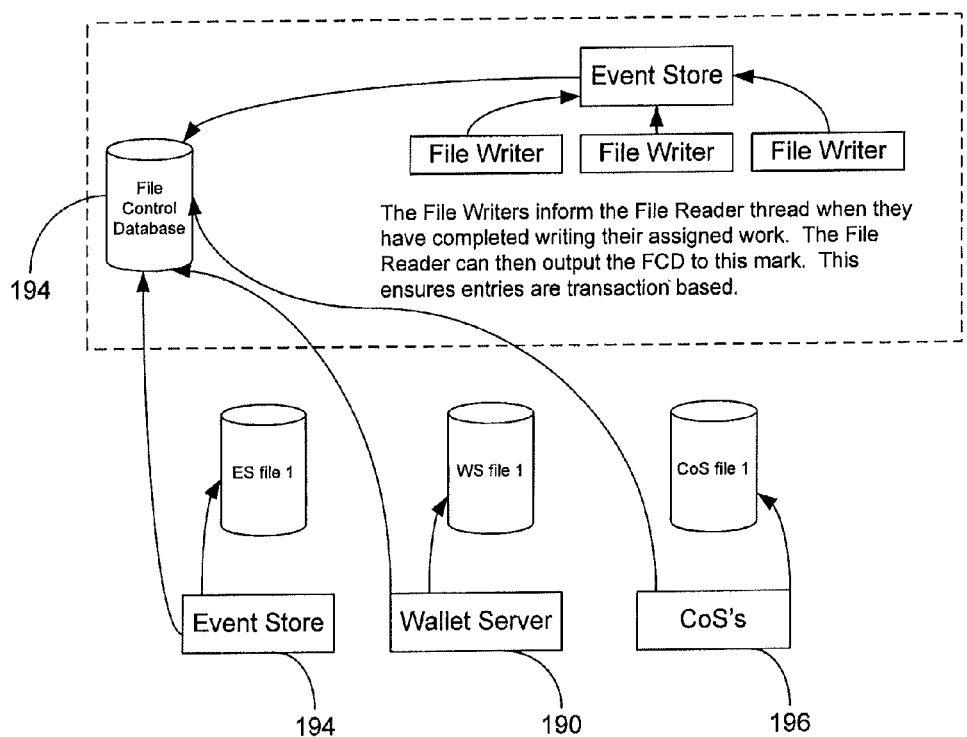

Referring to FIG. 12, the ES (194), WS (190), and COS (196) get their assigned output files with offset marks from the FCD (140).

File Control Database

The File Control Database (140) may be responsible for tracking the files as they pass through the EM (135) to their respective destinations. This will allow easy recovery from any failure situation. The EM (135) may retrieve all output file locations for specific servers from the Output File Location Table. This table may hold primary and secondary directory locations for each Pool Element. This functionality may exist in a common library. Pool elements may have multiple locations.

Servers may use a table to find their assigned work. A server's work is found by searching by the jobtype (the server pool for the server looking for work), jobargs (represents the pool element ID of the server looking for work), and status (is the job ready to be worked on) fields. Another table may link a job to its managed files. Managed files can have numerous jobs associated with them. Once a server's job/ID is known, this table is used to find all managed file IDs that need processing. This table may also keep track of how far a server has processed its assigned file.

Another table may hold information pertaining to a managed file including status (the status of the file), name/location (the name and location of the file), and mark (the offset the file has been written to).

Referring to FIG. 13A, the CS (120) creates original entry in the FCD (140) following its assignment to EM1 (135). Referring to FIG. 13B, the EM (135) searches the FCD (140) for all work assigned to its PC and jobtype (e.g., "cs.log.1"). Referring to FIG. 13C, the EM (135) processes the file and updates the FCD (140) as shown. Referring to FIG. 13D, the ES (194) and WS (190) may claim their assigned work and then begin processing the file. The "read to" marks may be updated periodically. Referring to FIG. 13E, when the EM (135) reaches the end of the file it may close the managed file and job. This may be configured to assume that it is the last file for this EM (135). The WS (190) then reads up to the "written to" mark and closes the job. Referring to FIG. 13F, the ES (194) then reads up to the "written to" mark and closes the job.

File Generation

The File Reader may parse the file generated by the CS (120) and Distributor. The CS (120) generated file may contain numerous events consolidated together with a range of event sequence numbers.

The File Writer threads within the EM (135) may be responsible for generating files for the ES (194), WS (190), and COS (196).

The CS (120) and Distributor generated file may comprise four different components: "header", "envelope", "start of transaction", and "end of file". The "header", "end of transaction", and "end of file" may provide background information; the "envelope" may contain the main data to be divided between the ES (194), WS (190), and COS (196).

Figure 14:
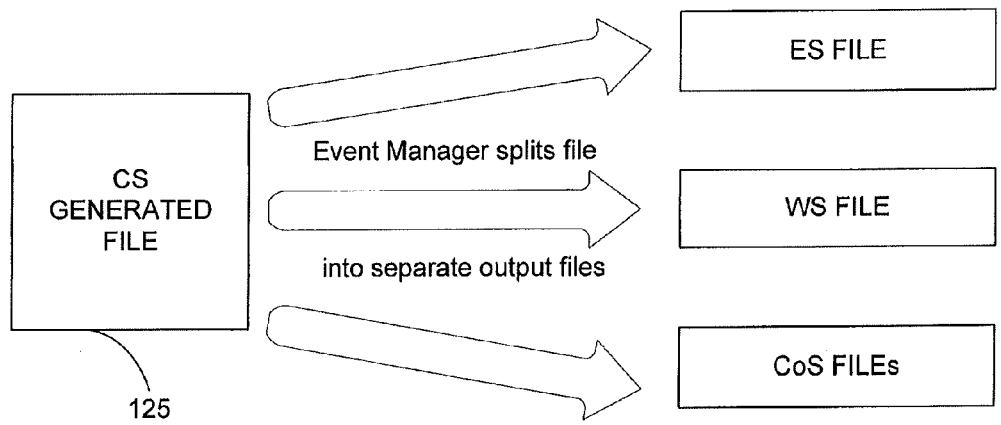
FIG. 14 presents a conceptual model of files being split from the CS Generated File to multiple files to be fed to different servers.

Referring to FIG. 14, the File Reader thread may parse the input Consumer Server files "envelope". The ES (194), WS (190), and COS (196) may each have their own attribute within the envelope. This may be used by the File Reader thread to separate all the ES, WS, and COS (196) event information into their respective output buffers. Each File Writer Thread may read from their respective output buffer to write their output file.

| Pseudo Code for File Reader threads |
|---|
| 1. Reads CS (120) File.<br>2. Finds Chunk.<br>3. Checks size of Chunk.<br>4. For each Chunk<br>    if STARTOFTRANSACTION<br>        For each set<br>            If routing attribute == ES<br>            //es<br>            Send to appropriate ES FileWriter buffer<br>            else if routing attribute == WS<br>            //ws<br>            Send to appropriate WS FileWriter buffer<br>    else if HEADER<br>        Check filename matches actual filename<br>    else if ENDOFFILE<br>        Loop to next CS file<br>        Update FCD<br>    else if WriteBuffers are full<br>        send FileWriters signal to write<br>        wait for FileWriters to finish<br>        update FCD<br>5. Done |

Pseudo Code for File Writer Threads
1. Awaits signal
2. Writes the buffer to file.
3. Sends signal back to FileReader.

File Details

Filename Generation—The respective filenames for these output files may be a combination of the filename attribute, along with the destination (i.e. event store, etc), combined with an EM (135) generated sequence number.

File Header—Output files may contain a header, which will contain information about the creating CS (120) or Distributor, creation date/time, and other filename specific information.

End Of File—A specific set may be added at the end of a CS log file (125) to inform the EM (135) it is the end of the file. This set will contain overall file size along with the filename and path to the next CS log file (125) to be read.

Start Of Transaction—Another specific set may be added by the CS (120) logger to mark the start of transaction segments within the file. The EM (135) may rely on this mark to determine how far ahead in the file it may read. These may also be used for transactional commits.

Merge Details—The EM (135) may preserve the order of requests from the CS (120).

1. EM (135) to ES (194)—Each EM (135) may typically undertake an M: N merge. M files may be read from the CS (preferably, one per server), and N output files are generated.

2. EM (135) to WS (190)—Each EM (135) may undertake an M: M merge. M files may be read from the consumer servers (one per server), and M output files may be generated.

The EM (135) may already have partitioned the data from different CS (120) into different files, so that each wallet server update daemon only reads updates from a subset of the CS (120).

3. EM (135) to COS (196)—Each EM (135) may undertake an M: N merge. M files may be read from the CS (120) (preferably, one per server), and N output files may be generated.

Event Manager API Support

The EM (135) may support API requests pertaining to the FCD (140) (e.g., to obtain a global view of all files). The Event Manager Reader thread may be responsible for routing API specific events to the DB reader/writer thread. This thread may interpret the event in the form of a database read and send a reply back to the API Server directly.

CPUB (105) Communication with API Server, EM, and CS

Figure 15:
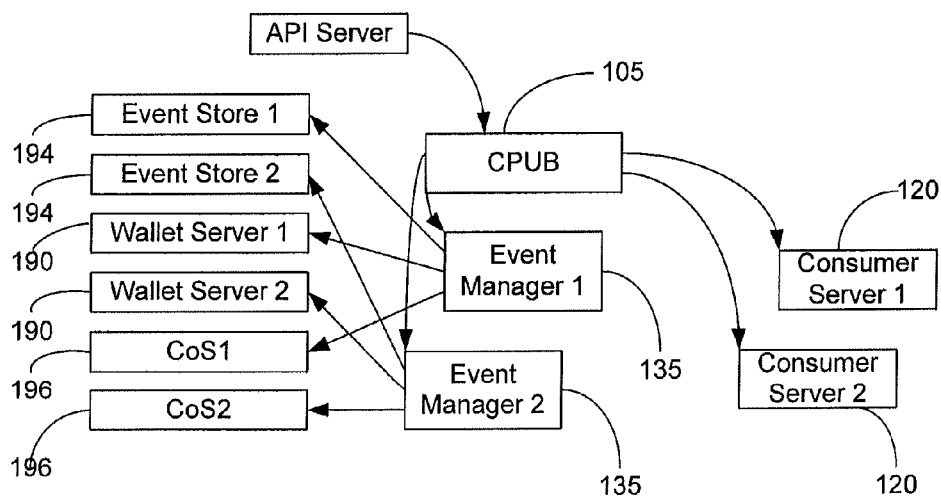
FIG. 15 illustrates a possible communication path between the API Servers, Event Managers, and Consumer Servers.

Referring to FIG. 15, the CPUB (105) communication path with the API Servers, EM (135), and CS (120) is highlighted below. The API Servers receive the physical EM (135) mappings. The CPUB (105) relays the local to physical partition mappings for the ES (194), WS (190), and COS (196).

CPUB (105) Communication with API Server

Figure 17:
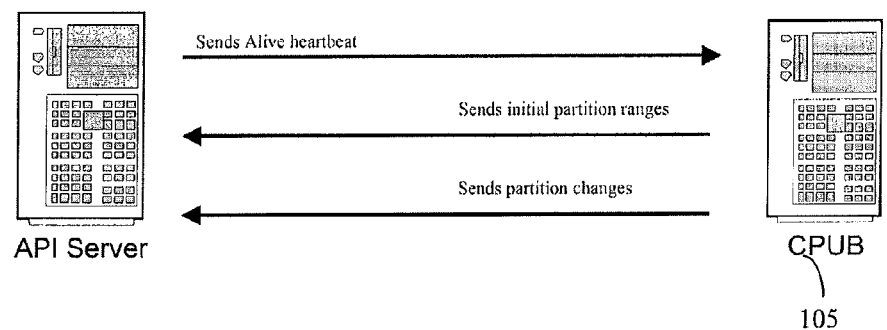
FIGS. 17-18 illustrate possible communication paths between the CPUB (105) and the API Servers, Event Managers, and Consumer Servers.

Referring to FIG. 17, the API Server notifies the CPUB (105). The CPUB (105) sends the initial EM (135) assignments to the API Server. The CPUB (105) sends any EM (135) assignment changes to the API server.

CPUB (105) Communication with EM

Figure 18:
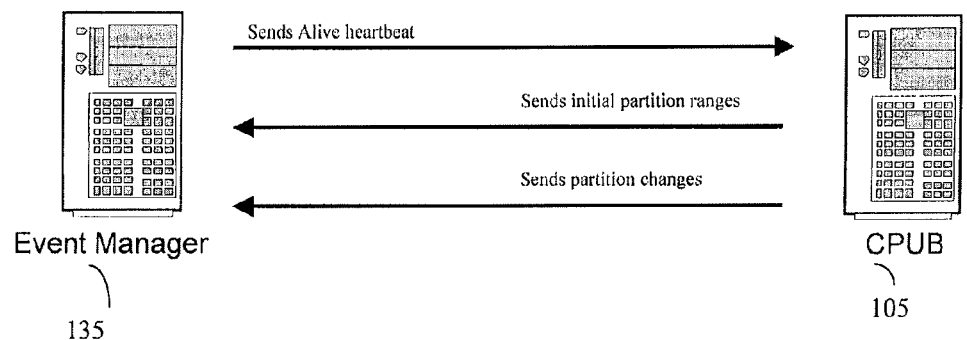

Referring to FIG. 18, the EM (135) notifies the CPUB (105). The CPUB (105) sends the initial ES (194) and WS (190) partition ranges to the EM (135). The CPUB (105) sends any partitioning changes to the EM (135).

EM Communication with CS, ES, WS, COS (196), and API Server

Referring to FIG. 15, the EM (135) may communicate with the CPUB (105) and API Server. The API Server may send API requests to the physical EM (135) it was assigned.

Figure 19:
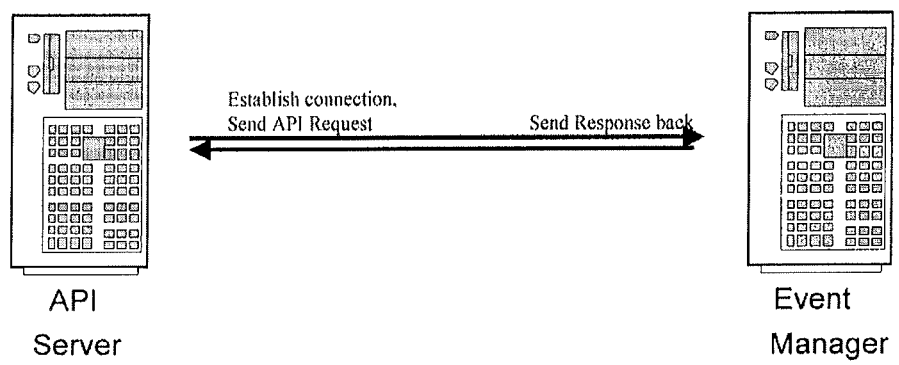
FIG. 19 illustrates a possible communication path between the API Server and the Event Manager.

Referring to FIG. 19, the API Server may establish a connection and send an API request. The EM (135) may send an answer back to the API Server.

The CPUB (105) may be responsible for replacing failed EM (135), tuning EM (135) performance, assigning workloads, and handling repartitioning of workloads.

The CPUB (105) may analyze the CS (120) workload information and partition the CS (120) between the EM (135) appropriately. In a preferred embodiment, the CPUB (105) will not reassign CS (120) servers between the EM (135) after the initial assignments unless the CS (120) partitions change or a CS (120) is killed or booted up.

Figure 8:
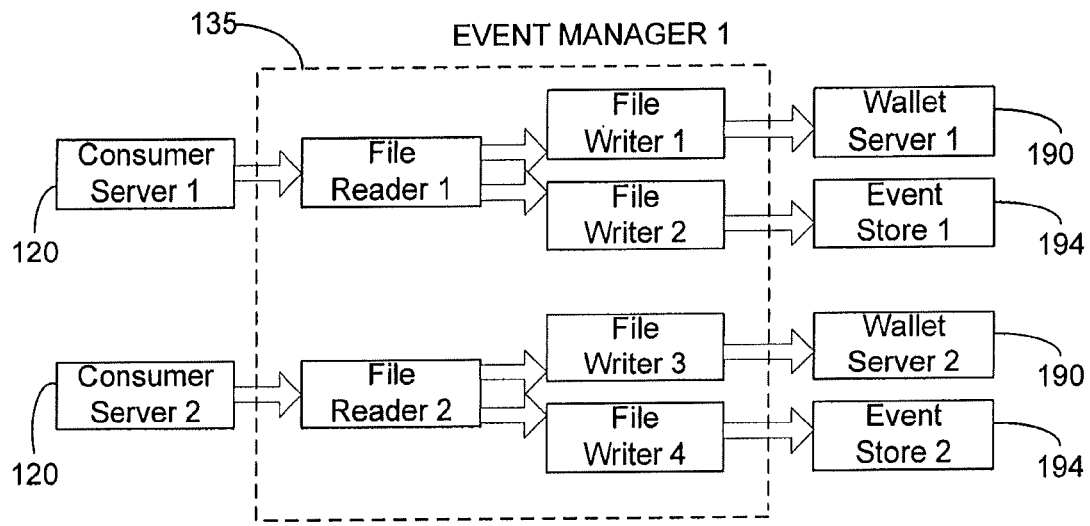
Figure 9:
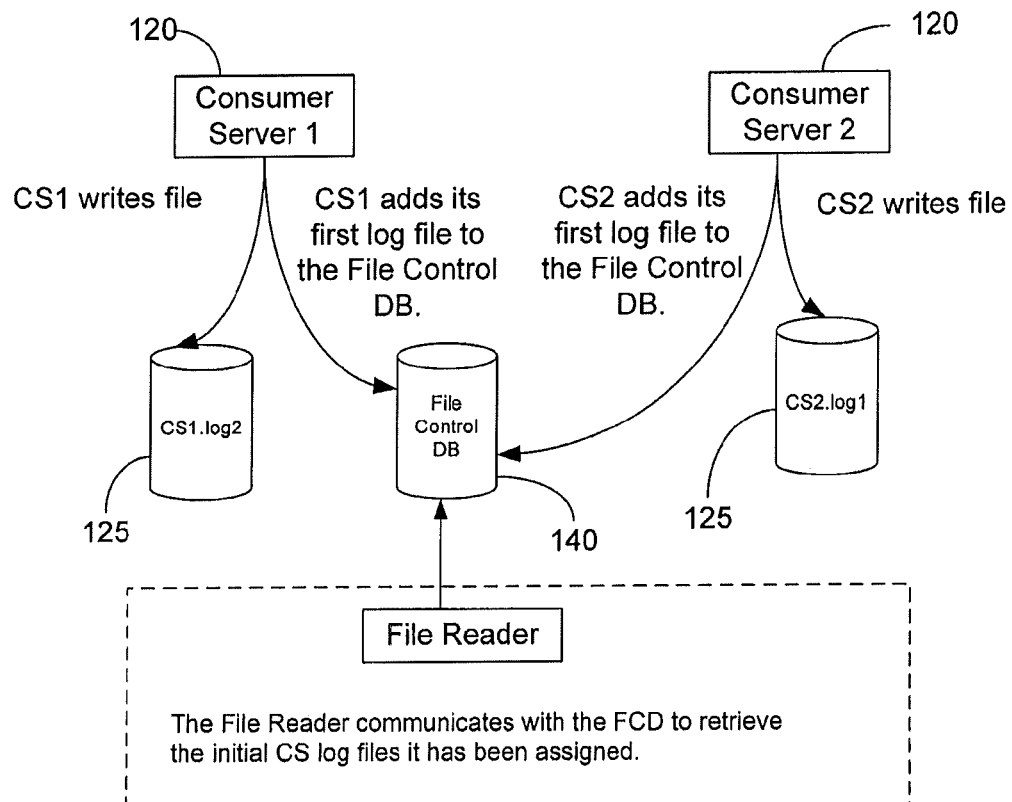
Figure 10:
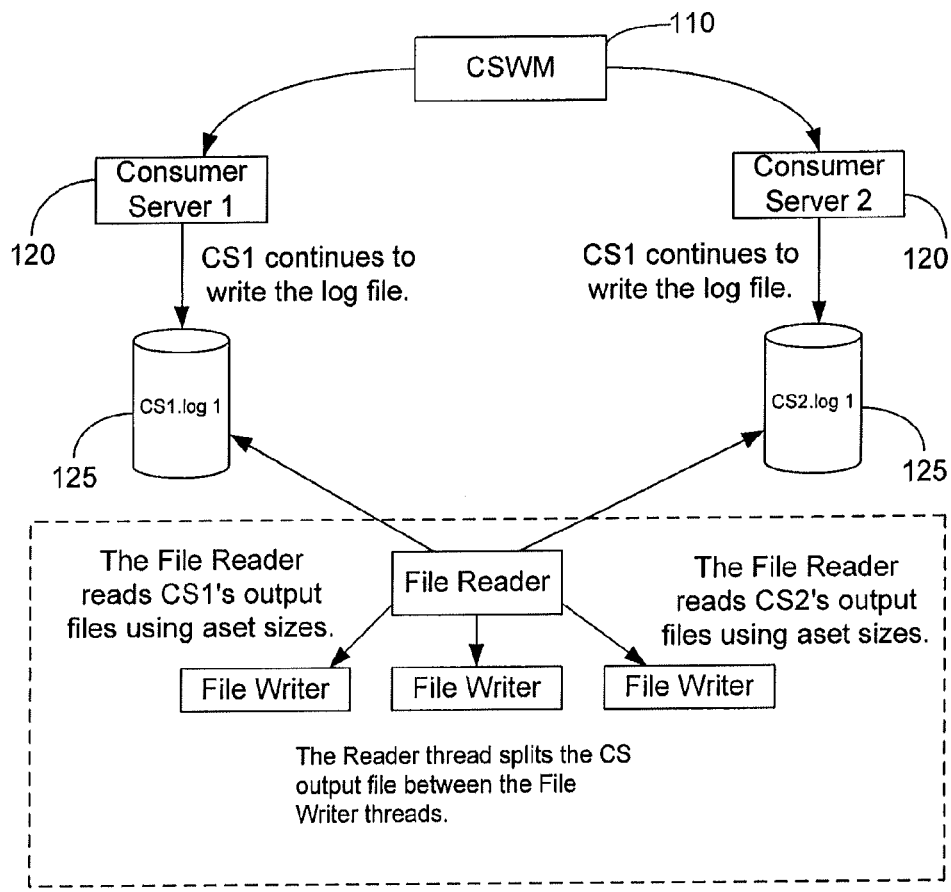

Referring to FIG. 8, the CPUB (105) may ensure the number of File Reader threads is equal to (or in a defined ratio with) the number of CS (120) that particular EM (135) is serving. In this example, EM 1 (135) is serving two CS (120). Therefore, two or more File Reader threads may be booted. Also, EM 1 (135) is serving two WS (190) and two ES (194) (four total servers). Thus, there may be four file writers.

If any physical CS (120) are repartitioned or changed, the CPUB (105) may change the EM (135) to CS (120) assignments, if necessary, and inform the appropriate CS (120).

The CPUB (105) may be responsible for booting the appropriate number of EM (135). It will know how many EM (135) to boot by using the information from the FCD (140).

The CPUB (105) may also be responsible for cleanly shutting down any EM (140) when necessary.

If any EM (135) fails, the CPUB (105) may replace the failed EM (135) so that the new EM (135) may continue where the old EM (135) left off. If a new EM (135) cannot be booted to replace the failed EM (135), the work may be repartitioned between the remaining EM (135) servers.

Referring to FIG. 15, the ES (194), WS (190), and COS (196) may never know or care about partitioning change. They will continue to process the files assigned to them. The EM (135) may not care about a partitioning change. It will continue to process its assigned files. The CPUB (105) repartitions the CS (120), thus creating new CS (120) to EM (135) assignments. The CS (120) go ahead and start new partitioning being sure to start new files.

Server Failure Strategies

If any EM (135) fail, the newly rebooted EM (135) (CPUB (105) will handle EM reboot) may use the database to recover from where it left off. The database may comprise fairly close data points as to where the EM (135) was on any CS log file (125) and EM (135) output files. During such a failure the CS (120) may continue to write files. The ES (194), WS (190), and COS (196) will also continue to read the EM (135) output files up to the latest byte offset they had received from the FCD (140).

If the FCD (140) fails, the CS (120) may continue processing normally. If any of the ES (194) fail, the newly rebooted ES (194) may use its database to recover from where it left off. The database preferably comprises fairly close data points off where the ES (194) was on any EM (135) output files.

If any of the ES (194) fail, the EM (135) may continue processing unaffected. If any of the COS (196) fail, the newly rebooted COS (196) may use its database to recover from where it left off. The database preferably comprises fairly close data points off where the COS (196) receiver was on any EM output files. If any of the COS (196) receivers fail, the EM (135) will continue processing unaffected. It will keep generating all COS (196) output files.

If any of the WS (190) fail, the newly rebooted Wallet Server (190) may use its database to recover from where it left off. The database preferably comprises fairly close data points off where the WS (190) was on any EM (135) output files. If any of the WS (190) fail, the EM (135) may continue processing unaffected.

If a CS (120) fails, the EM (135) may continue up to the last written end of transaction mark recorded. Once the EM (135) has reached the end of the last written transaction, it will continue waiting for the file to finish. The CPUB (105) will tell the EM (135) to close the CS log file (125) once it is complete. The EM (135) will then continue to check the FCD (140) for newly assigned CS log files.

Server backups and database backups (i.e., NFS or a replication procedure) may be employed to alleviate crashes, downtime, etc.

A reject & resubmit process/component (see, FIG. 16) may generate a feed of events to the EM (135) for events that cannot be routed to the correct CS (120) (or timed out due to failure for the CS (120) to reply). Each failed event may be tagged with a reason (e.g., the event may contain some error that requires some intervention before the event is reprocessed) or the event may be marked for automatic reprocessing to recover from an earlier processing failure.

Event Manager File Management

Due to the heavy amount of file management needed for the EM (135), a few processes/tools to deal with file cleanup and organization may be preferably included in the system.

File Control Database Overview

Figure 2:
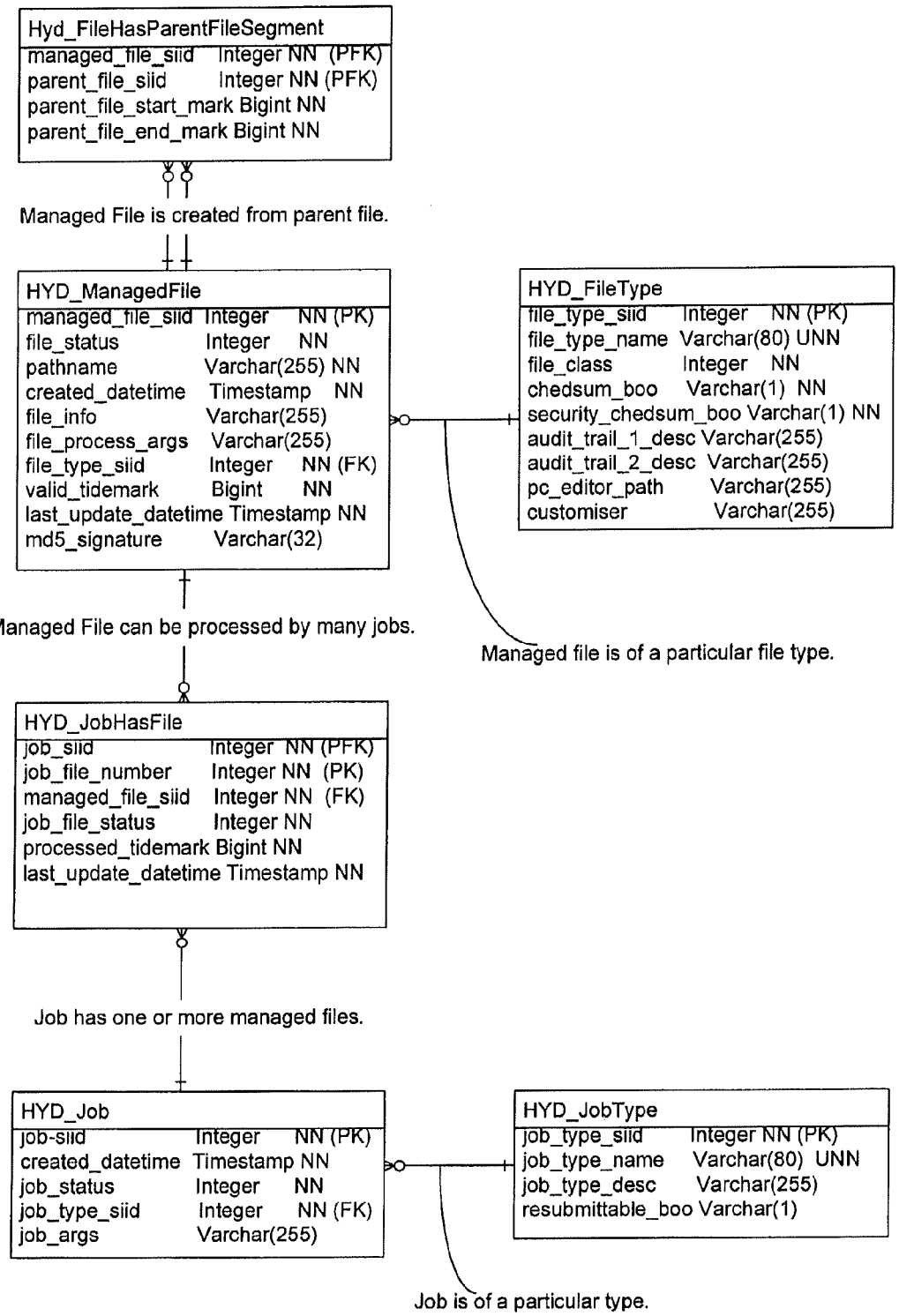
FIG. 2 presents an example schema for the File Control Database.

Referring to FIG. 2, this example schema fragment illustrates a possible structure of the FCD (140). A job may be created for each downstream process that wishes to consume one or more files. These entities are transactionally modified by the consuming process as the processing completes on each file (see below).

The same sets of files (jobs) can then be dispatched to one or more downstream processes, and by tracking the job information the FCD (140) can determine if files can be archived or deleted as all the downstream processes have consumed the file.

A method which persists the process (keeps the process active) of each file for restart is preferred. Each file may have an associated write pointer, and each consumer process can maintain a separate read pointer.

The value of the read pointer may be definitive, where the external or downstream system does not maintain its own read pointer, and the FCD sub-system may be called by the internal or external process to update how far this file (job) has been consumed. On failure recovery, the consuming system would restart at this pointer.

In another embodiment, where the downstream system maintains its own transactional read pointer in a local database, then the read pointer may be used for informational use by the FCD (140) (e.g., GUI display), but the FCD (140) may be updated as the consuming system finishes processing each file.

A table may be used to track/search the managed input file segments (if any) that were used to generate a managed output file.

Configurable Output Stream

The Configurable Output Stream (COS) (196) feature is used to filter, consolidate and replicate data to be provided to downstream systems, and is implemented using an attribute set such as that described in U.S. patent application Ser. No. 11/151,930 (System and Method for a Functional Extensibility Framework, Clubb et al., filed Jun. 14, 2005) regarding a framework for data extensions.

COS (196) may enable the ability to collect, filter and bring together information from the real time process to be fed into a number of downstream (typically external) systems including:

Settlement record output from real time or billing;
    Commissions record generation;
    Usage trend data from real time rating;
    Invoice detail and total records; and
    Multiparty settlement records.

COS (196) supports the configuration of data collection during real time rating so that data used by rating can be used for reporting rather than re-deriving the information from the data warehouse. COS (196) provides ability to configure and supply the data needed by the enterprise, partitioned for the needs of the downstream system.

Figure 3:
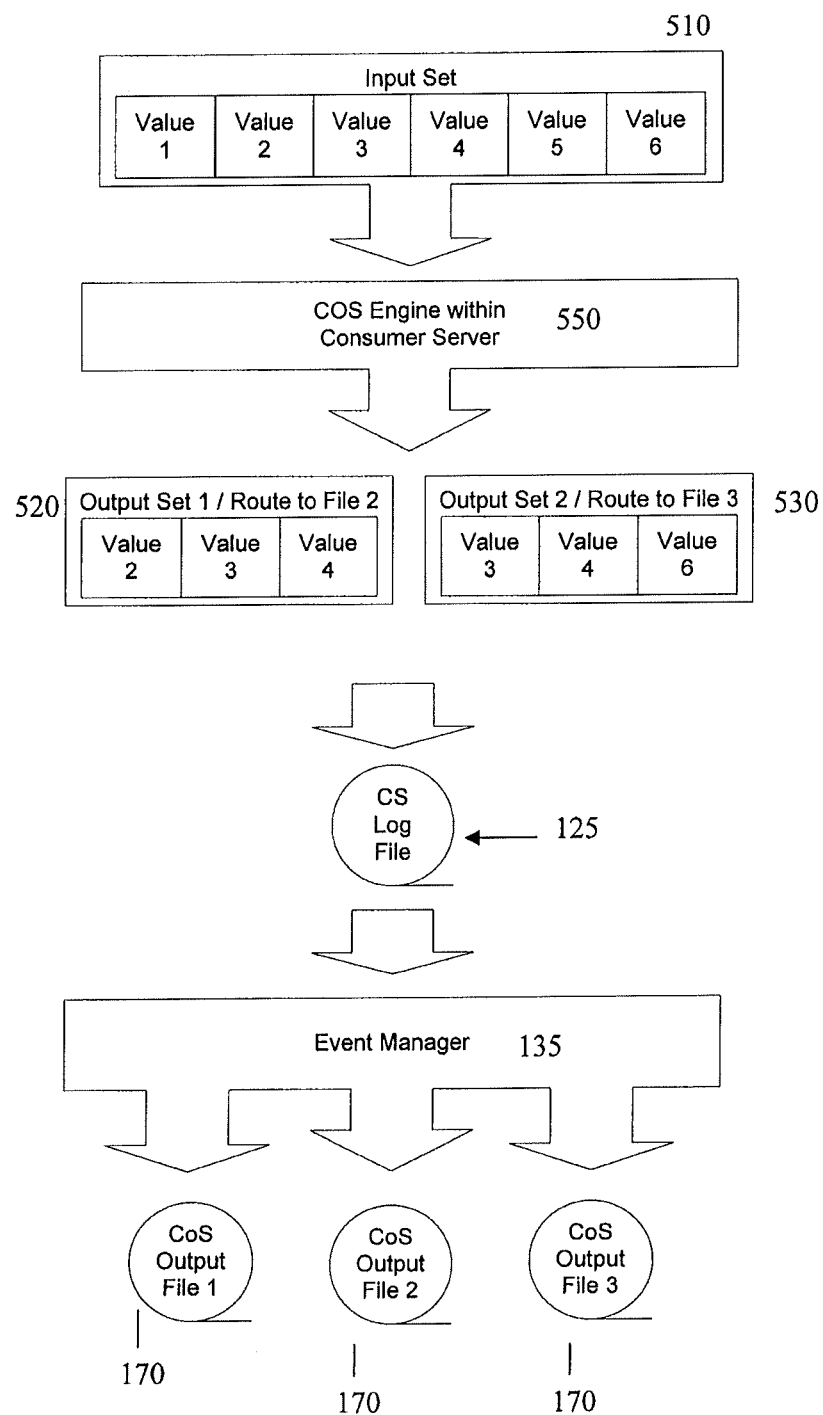
FIG. 3 represents an embodiment of the COS (196) flow through the system.

Referring to FIG. 3, a framework may be used to facilitate the generation of derived information for each COS (196) within the CS (120). The event data incorporating the COS (196) is written to the CS log file (125), and is passed to the EM (135). The generation by the EM (135) of the downstream files may include the generation of multiple COS (196) streams or sub-streams. Data and the resultant files may be partitioned on multiple dimensions including time. For example, the COS (196) might generate file streams of derived data each for fraud, commissions, and settlement with a particular long distance carrier. The fraud information might be a separate file stream generated every 10 min. Alternatively, the commission data might be 500 files of commission data for each of 500 trading partners, where a new file is only generated every week. The file streams may be created on a customized basis for the purpose for which they are created.

The generation of new output records and configuration of new output destinations may be entirely configured through the FCD (140). The FCD (140) may manage the routing of the files to multiple destinations beyond the EM (135). Files need not be closed and complete before being delivered to downstream systems.

Figure 4:
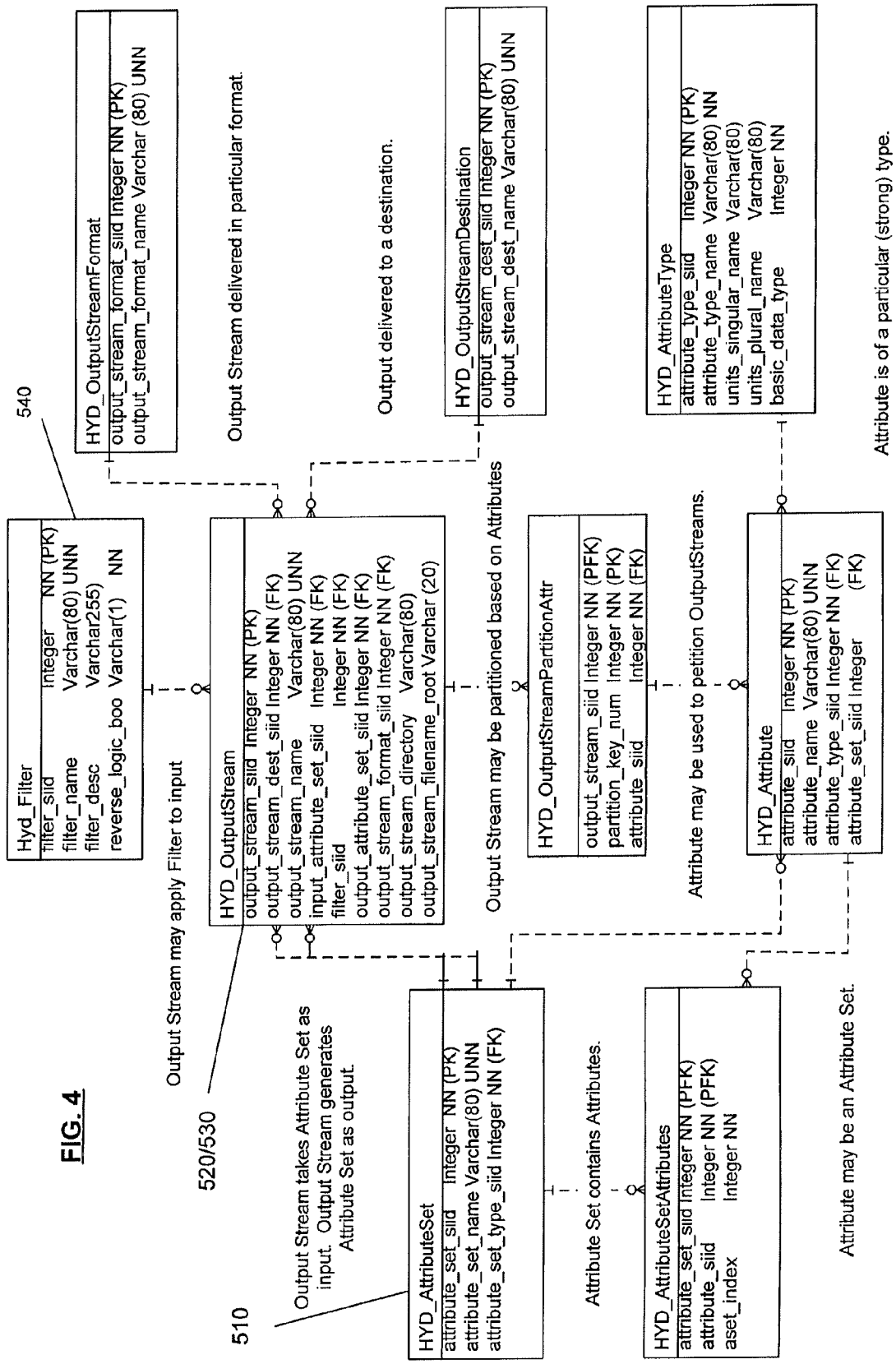
FIG. 4 represents an embodiment of a database schema to support a COS (196) Consumer Server.

Referring to FIG. 4, a support schema for a COS (196) engine (550) flow is depicted. Within the Consumer Server (120) a transaction may be processed and have an associated input set of data (an 'attribute set') (510). This input attribute set (510) may be external data or internally derived information using procedural code or the system (100) may be used to derive additional values within the input set (510). Please see, U.S. patent application Ser. No. 11/151,930 (System and Method for a Functional Extensibility Framework, Clubb et al., filed Jun. 14, 2005) for further details.

The COS (196) engine (550) may derive a number of output streams from the input set (510). Each output stream may have an associated output set (520,530). The values in the output sets (520,530) may be automatically copied from the input sets (510)—each output set (520,530) may contain a subset of the same attributes as used by the input set (510). The act of generating the output sets (520,530) may automatically trigger the lazy evaluation of some of on the input attributes. The framework (100) may therefore be invoked to enhance values in the output set (520,530). The output record is then simply a projection of attributes from an input record.

Each output set (520,530) may have a filter (540). This filter (540) may determine if the corresponding output set (520,530) is generated. For example, output sets for fraud, commissions and settlement could be defined, and the filter (540) for each may select attribute values to determine if the corresponding records are generated. These filter (540) conditions may reduce the amount of generated output. For example, if only 10% of customers have commissionable services, the condition can limit generation of commission records for the 10% of customers who are commissionable. Thus, only data valid for an output is generated for downstream processing.

Figure 5:
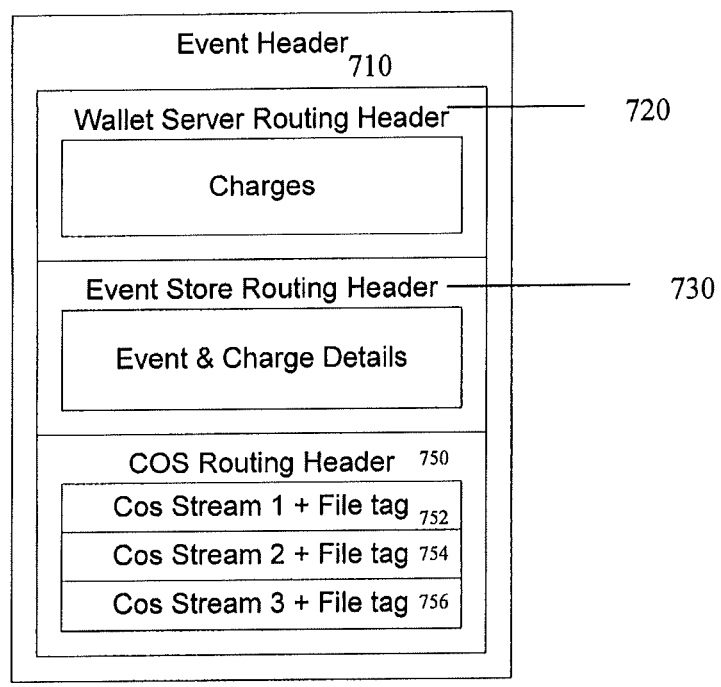
FIG. 5 is a representation of a record written to the CS Log File for the event.

All of the COS (196) may be collected into an aggregated record. That may be combined with other information generated while processing the event. Referring to FIG. 5, there is shown a representation of the record written to the CS log file (125) for the event which includes a variety of headers (wallet server routing header (720), event store routing header (730), and COS routing header (750)). The COS section (750) of the envelope (710) further contains several streams (752, 754, and 756) to be sent to various downstream processes.

The CS (120) may aggregate together information that is destined for each of the downstream systems. Each section of data may have an identifying header (110). Each of the COS (196) streams (752, 754, 756) may be further tagged with the destination file/stream.

In one embodiment, the file tags may be built in two parts; each of the COS (196) output streams (752, 754, 756 . . . ) may have a directory and file name root (see, HYD_OutputStream) (520). One or more attributes many then be used to partition the output file space, generating unique filenames based on attribute values (including time periods). For example, 'reseller records' could be split by 'reseller id' and 'CRM event records' by 'event processing hour'. The filename may have multiple components of this suffix which must be ordered. The filename extension components may be ordered based on the HYD_OutputStreamPartitionAttr.partition_key_num. The schema can specify a file partition based on either attributes of the output record (for example, to split records by the reseller id) and additionally use preconfigured partitions that do not have to exist on the event. For instance, the output files may be desired to be split by processing hour so that a downstream system can retrieve records on an hourly basis with new records rolling to a new output file. Derived events may include Secondary events to be fed into a downstream system (e.g., legacy billing system).

Event Store

In a large system, some type of partitioning is required to allow for the massive insertion rates. Each account may be assigned to a logical event store. These logical event stores may be grouped into file streams. So, events for an account may be stored in the same file stream.

The ES (194) may store persistent transactions and their associated charges. Within a production system there may be one or more event stores. Each event may be stored on one event store, but a single Event Store (194) may read input files from each EM (135). The CS (120) may put a header in the CS log file (125) to indicate which ES (194) should receive the event; this determines the output file to which the event is written by the EM (135).

Once a record enters the Event Store, it is viewable by CSR query or for Billing. The Event Store may be broken up into two different "sides" that we term, for purposes of illustration only, "Left" and "Right". From the outside, CSR Query or Billing, the sides are irrelevant, as all records are visible regardless of which "side" the record current exists. The Left Side is responsible for all newly arrived records while the Right Side stores records in formats more suitable for CSR activities and/or Billing.

The Left Side may be responsible for writing all newly received records onto the end of an existing file. This may be a sequential action writing to the end of a file. These records may be maintained in a RAM-like storage mechanism for fast usage inquiry functions.

The Left Side may read and consolidate all events into a series of files that is indexed to allow historical event access (for display by CSR, or for billing access) until the events have been organised into the Right Side. Records may arrive at the Event Store (194) via the "Left Side". Once processed by the Left Side, events may be available for CSR Query and/or Billing. Once sufficient records exist in the Left Side, the Right Side may assume ownership of the events.

The Right Side of the architecture may group events belonging to the same account so they are contiguous on physical disk blocks. Indexes and then stored in database tables. This allows for the fastest retrieval, as fewer physical I/Os are required to retrieve records associated with the same account.

Interfaces

Interfaces may be provided for:

grabbing a record from the CS log(125) (via the Event Manager (135)) and inserting the record into the ES (194);

inserting a record into the Account Billed table using the Acct. # Filter Criteria (Filter Criteria allows for the selection of events. If no filter criteria is specified, all records prior to the time of insertion will be marked. It may, however, be desired to only bill specific records. For example, the enterprise may only wish to bill "call" records that occurred prior to a specific date. Thus, "Event Id" and "Event Date" may be used as filter criteria. "Event Id" is an indicator of the type of record. Normal Call Records may have a different "Event Id" than payments.);

retrieving records for Billing (All "marked" records may be collected and given to billing. Records may also be "unmarked".);

deleting records in the Event Store that have been "Marked for Billing" (the delete may occur at merge time by not copying the records into the newly created merge file).

The invention claimed is:

1. A computerized architecture for processing events comprising:
a first router;
a set of processors comprising two or more processors; and
at least one router/multiplexer;
wherein said first router is configured with a set of computer-executable instructions to determine which of said processors should process an event based upon a consumer identifier;
wherein said first router is configured to send an event to said determined processor;
wherein said determined processor is configured to initially process said event;

wherein said determined processor is further configured to embed a set of tags in a set of event data and to send said set of event data relating to said event to said router/multiplexer; and wherein said router/multiplexer parses said set of event data and is configured to reorganize said set of event data according to an account identifier for further processing, wherein said router/multiplexer utilizes said set of tags to determine where to send said set of event data for further processing.

2. A computerized architecture as claimed in claim 1 wherein each of said processors is further configured to:

send said set of event data relating to said event to said router/multiplexer in a file further comprising a header;

embed said set of tags in said header;

wherein said router/multiplexer is configured to utilize said set of tags in said header to determine where to send said set of event data for further processing.

3. A computerized architecture as claimed in claim 1 wherein each of said processors from said set of processors are mapped to a particular router/multiplexer from said at least one router/multiplexer.

4. A computerized architecture for processing events as claimed in claim 1 wherein said router/multiplexer is configured to reorganize said set of event data for further processing by creating a file comprising a subset of said set of event data.

5. A computerized architecture for processing events comprising:

a first router;

a set of processors comprising two or more processors; and at least one router/multiplexer;

wherein said first router is configured with a set of computer-executable instructions to determine which of said processors should process an event based upon a consumer identifier;

wherein said first router is configured to send an event to said determined processor;

wherein said determined processor is configured to initially process said event;

wherein said determined processor is further configured to embed a set of tags in a set of event data and to send said set of event data relating to said event to said router/multiplexer;

wherein said router/multiplexer parses said event data to create a file comprising a subset of said set of event data for additional processing, wherein said router/multiplexer utilizes said set of tags to determine where to send said subset of said set of event data for additional processing; and wherein said router/multiplexer is configured to reorganize said subset of said set of event data according to an account identifier.

6. A computerized architecture as claimed in claim 5 wherein said set of tags designate said subset of said set of event data for evaluation by a settlement system.

7. A computerized architecture as claimed in claim 5 wherein said set of tags designate said subset of said set of event data for evaluation by a trend analysis system.

8. A computerized architecture as claimed in claim 5 wherein said router/multiplexer creates a plurality of said subsets.

9. A computerized architecture as claimed in claim 8 wherein an output stream is defined through an application programming interface and said determined processor is further configured to generate said output and send said output to said router/multiplexer.

10. A computerized method for processing events comprising the steps of receiving an event on a first router;

identifying a consumer associated with said event;

determining a processor from a set of two or more processors that is associated with said identified consumer;

sending said event to said processor;

initially processing said event on said processor;

generating a set of event data related to said initial processing of said event;

sending said set of event data to said router/multiplexer;

parsing said event data on said router/multiplexer; and reorganizing said event data for further processing on said router/multiplexer;

wherein said initial processing step includes checking a balance stored on a logical wallet on said processor to determine if said event may be approved and said reorganizing step includes reorganizing said event data for further processing on said router/multiplexer based on an account identifier associated with said identified consumer.

11. A computerized method for processing events comprising the steps of:

receiving an event on a first router;

identifying a consumer associated with said event;

determining a processor from a set of two or more processors that is associated with said identified consumer;

sending said event to said processor;

checking a balance stored on a logical wallet on said processor to determine if said event may be approved;

generating a set of event data related to said event on said processor;

defining, through an application programming interface, a subset of said event data;

creating at least one subset of said event data with a set of embedded tags indicating an external process;

sending said subset to said router/multiplexer;

parsing said subset on said router/multiplexer to determine said external process; and sending said subset to said external process.

* * * * *